US005663876A

United States Patent [19]
Newton et al.

[11] Patent Number: 5,663,876
[45] Date of Patent: Sep. 2, 1997

[54] CIRCUIT AND METHOD FOR ACHIEVING ZERO RIPPLE CURRENT IN THE OUTPUT OF A CONVERTER

[75] Inventors: Stephen F. Newton, Forney; Allen Frank Rozman, Richardson, both of Tex.

[73] Assignee: Lucent Technologies Inc., Murray Hill, N.J.

[21] Appl. No.: 533,222

[22] Filed: Sep. 25, 1995

[51] Int. Cl.[6] .............................. H02M 7/06; H02M 1/14
[52] U.S. Cl. ................................. 363/126; 363/46
[58] Field of Search ..................... 363/17, 19, 98, 363/126, 132, 45, 46, 47

[56] References Cited

U.S. PATENT DOCUMENTS

| | | | |
|---|---|---|---|
| 4,899,271 | 2/1990 | Seiersen | 363/126 |
| 4,959,764 | 9/1990 | Bassett | 363/16 |
| 5,126,931 | 6/1992 | Jitaru | 363/21 |
| 5,274,543 | 12/1993 | Loftus, Jr. | 363/127 |
| 5,303,138 | 4/1994 | Rozman | 363/21 |
| 5,331,533 | 7/1994 | Smith | 363/20 |
| 5,353,212 | 10/1994 | Loftus, Jr. | 363/17 |
| 5,434,767 | 7/1995 | Batarseh et al. | 363/16 |
| 5,459,650 | 10/1995 | Noro | 363/24 |

OTHER PUBLICATIONS

Article from the JFPC Jun. 1991 Proceedings entitled "A New Efficient High Frequency Rectifier" Circuit by C. Peng, M. Hannigan, O. Seiersen; pp. 236–243.

Article from the 1994 IEEE entitled "High Efficiency DC–DC Converter" by Ionel Dan Jitaru and George Cocina, pp. 638–644.

Article from the HFPC May 1995 Proceedings entitled "The Impact of Low Output Voltage Requirements on Power Converters" by Ionel Dan Jitaru; pp. 1–10.

Article from the HFPC May 1995 Proceedings entitled "The Performance of the Current Doubler Rectifier with Synchronous Rectification" by Laszlo Balogh; pp. 216–225.

Article from the JFPC Jun. 1991 Procedings entitled "A New Output Rectifier Configuration Optimized for High Frequency Operation" by Kevan O'Meara; pp. 219–225.

Article entitled "Elements of Electrical Engineering" A Textbook of Principles and Practice by Arthur L. Cooks, B.S., M.S.; pp. 475–479 Aug. 1924.

*Primary Examiner*—Peter S. Wong
*Assistant Examiner*—Bao Q. Vu

[57] ABSTRACT

A power converter and a method of operating a power converter. The power converter includes: (1) a transformer for receiving bipolar electrical input power from a power source, the power substantially free of dead time and (2) a hybridge rectifier coupled to the transformer and including first and second output inductors of independently selectable, differing inductance, the hybridge rectifier receiving the input power from the transformer and rectifying the input power to produce an output power substantially free of ripple current at a predetermined duty cycle operating point of the converter, the first and second output inductors being of independently selectable, differing inductance thereby to allow the predetermined duty cycle operating point to be adjustable.

20 Claims, 7 Drawing Sheets

5,663,876

CIRCUIT AND METHOD FOR ACHIEVING ZERO RIPPLE CURRENT IN THE OUTPUT OF A CONVERTER

TECHNICAL FIELD OF THE INVENTION

The present invention is directed, in general, to power circuitry and, more particularly, to a circuit for achieving a zero-ripple current condition in a hybridge rectifier circuit of a power converter.

BACKGROUND OF THE INVENTION

Increased power density is a continuing goal of modern power supply design. High power density is particularly crucial in applications wherein the allocated space for the power supply relative to the power output is restricted. In addition to being highly compact, the power supply should also be efficient to limit heat-creating power dissipation. Illustrative applications for a high density power supply include an off-line power supply used to power a laptop computer or a power supply module for a telecommunication system employing an Integrated Services Digital Network ("ISDN").

One alternative to decrease the size of the power supply relative to the power output is to increase the operating frequency of the power supply. However, there are upper practical limits to the operating frequency for the components of the power supply. Therefore, a power supply topology capable of offering higher efficiency at elevated switching frequencies is required to ease the task of thermal management at higher power density.

Employing a current doubler rectifier in a converter results in a particularly attractive topology for powering high current loads for applications such as those mentioned above. This topology reduces the current density in critical secondary-side magnetic components of the converter and offers a twofold increase in the equivalent output frequency without concomitantly increasing the operating frequency and the associated switching losses of the converter.

The first known reference to the current doubler rectifier is found in *Elements of Electrical Engineering, A Textbook of Principles and Practice,* by Arthur L. Cook, John Wiley & Sons, Inc., 1924. Presently, the current doubler rectifier is more readily referred to as a "hybridge" rectifier circuit. Such circuit is more definitively disclosed in U.S. Pat. No. 4,899,271 to Seiersen, issued on Feb. 6, 1990, entitled "Power Supply Circuit" and incorporated herein by reference. The circuit of Seiersen comprises a transformer with a pair of rectifier diodes connected to an output load. The first electrode of the rectifier diodes is connected to the secondary winding of the transformer and to an inductor located between the rectifier diodes and the output of the power supply. The second electrode of the rectifier diodes is connected through a capacitor to the output of the power supply. The secondary winding of the transformer draws current through one of the diodes via one inductor while the other inductor draws current through the same diode. This operation allows the secondary winding of the transformer to be partially bypassed such that both currents simultaneously contribute to the output current.

As hereinafter described, the hybridge rectifier circuit yields several unique advantages. First, the transformer structure is greatly simplified because there is no need for center-tapping the secondary winding, thereby eliminating one high current termination thereon. Also, the secondary winding and its terminations carry approximately half the current of their full wave equivalents. Moreover, the hybridge rectifier circuit offers a lower turns ratio and finer steps in the transformer, resulting in reduced leakage inductance for a more efficient transformer. Further, the control and operation of the primary side of the converter, including the duty cycle of the power switches, remains unchanged. Therefore, the hybridge rectifier circuit can easily be added to an existing front-end converter system design.

Second, while the hybridge rectifier circuit requires an additional inductor, both output inductors carry only half of the output current and operate at half the operating frequency of their full wave counterparts. These individual inductors are, thus, less bulky, leading to a more flexible design. Finally, the power dissipation across the converter is more evenly distributed thereby easing thermal management and packaging allowing for a more compact overall converter design. Moreover, the current waveforms of the individual inductors are typically out of phase resulting in a partial or full cancellation of the ripple components in the common output impedance of the converter. The resulting reduction, or better yet cancellation, of the output ripple current renders a more efficient converter. Thus, for the aforementioned reasons, the hybridge rectifier circuit provides a viable solution in high output current applications.

As previously mentioned, the hybridge rectifier circuit is compatible with several front-end converter designs including a conventional bridge-type power train. One main attribute of the bridge-type power train is that the transformer windings are driven with power switches providing bipolar voltages with dead time in between. At a 100% duty cycle of the power switches, a condition exists whereby the ripple currents in the two output inductors are equal and opposite, leading to full cancellation and a zero-ripple current at the output capacitor of the converter. The zero-ripple current condition only occurs at a single input voltage for a given power train and output voltage of the converter. For bridge-type converters, the zero-ripple current point can only occur at the lowest input voltage; thereafter, the capacitor ripple current continually increases as the input voltage increases. Thus, the filter inductors and capacitors at the output of the converter must be oversized for the worst-case operating condition, thereby diminishing the benefit derived from converters operating at the zero-ripple current condition. Moreover, operating the converter at the 100% duty cycle in an attempt to cancel out the output ripple current is not a practical operating point for the power supply. Thus, other converter topologies employing the hybridge rectifier circuit are more attractive.

The hybridge rectifier circuit can also be employed with a converter employing an active clamp front-end. This power train also includes power switches that drive the transformer with bipolar voltages, but the dead time exhibited by the bridge-type power train is not present. As a result of the lack of dead time, the frequency of the ripple current encountered by the output capacitor is equal to the switching frequency of the power train. This converter type also experiences a zero-ripple current operating point; however, in opposition to the bridge-type converter where the zero-ripple current condition occurs at the 100% duty cycle, the active clamp converter experiences the zero-ripple current condition at a 50% duty cycle. Operating the converter at a 50% duty cycle is a more realistic operating point for the converter.

It is possible, therefore, to design the converter centered at an input voltage range encompassing the zero-ripple current point, thereby minimizing the worst case ripple current at the output of the converter. While the active clamp converter moves the zero-ripple current condition off the 100% duty cycle, it is undesirable to design the power train at the input voltage relating to the 50% duty cycle because of the stress placed on the components at off design input voltages. Thus, although the present day active clamp converter is an attractive power supply for high current loads, it is limited in its application. More specifically, the active clamp converter suffers from the shortfalls of excess stress on the converter components or excess ripple current in the output depending on the selected design of the converter. Accordingly, a system to reduce the output ripple current independent of the operating condition of the converter is necessary.

There have been attempts in the prior art to deal with ripple current cancellation in converters. For instance, Loftus, in U.S. Pat. No. 5,353,212, issued Oct. 4, 1994, entitled "Zero-Voltage Switching Power Converter with Ripple Current Cancellation" and incorporated herein by reference, discloses an integrated magnetic arrangement that provides ripple current cancellation at selected operating points of the converter. In an illustrative embodiment of Loftus, the inductances of the integrated magnetic device are selected such that the output currents are equal, but out of phase for a given load; this condition provides for the complete cancellation of the ripple current at the output of the converter. While Loftus teaches a technique to reduce the ripple current of a converter, Loftus' technique requires the combination of an integrated magnetic structure with a center-tapped rectifier circuit in the secondary side of the converter. In Loftus, integrating the magnetic devices is required to perform ripple current cancellation.

Hypothetically, if the center-tapped rectifier circuit disclosed in Loftus includes a transformer with a pair of discrete inductors, then ripple cancellation cannot be performed by the discrete inductors and the output capacitor must be oversized to handle the ripple current in the output of the converter. Thus, Loftus' technique is limited in its application to converters powering high current loads because the converter must incorporate either an integrated magnetic device or an oversized capacitor into the design to achieve ripple cancellation both of which add size and complexity to the design of the converter.

Accordingly, what is needed in the art is a circuit and method to achieve a zero-ripple current condition in the output of a power converter without adding size and complexity to the rectifier circuit of the converter.

SUMMARY OF THE INVENTION

To address the above-discussed deficiencies of the prior art, the present invention provides a power converter and a method of operating a power converter. The power converter comprises: (1) a transformer for receiving bipolar electrical input power from a power source, the power substantially free of dead time and (2) a hybridge rectifier coupled to the transformer and including first and second output inductors of independently selectable, differing inductance, the hybridge rectifier receiving the input power from the transformer and rectifying the input power to produce an output power substantially free of ripple current at a predetermined duty cycle operating point of the converter, the first and second output inductors being of independently selectable, differing inductance thereby to allow the predetermined duty cycle operating point to be adjustable.

The present invention therefore introduces a converter topology that achieves zero ripple current at any predetermined duty cycle operating point by altering the relative inductances of the first and second output inductors. This is starkly contrasted with the prior art, wherein the output inductors were unerringly of the same value, severely restricting the freedom to choose a duty cycle operating point suitable to a given application.

In a preferred embodiment of the present invention, the power source is selected from the group consisting of: (1) an active clamp circuit and (2) a ZVS half bridge circuit. Therefore, the present invention is not restricted to a given power train front-end, as long as the front-end is capable of generating bipolar power with essentially no dead time.

In a preferred embodiment of the present invention, a secondary winding of the transformer is free of a center tap. The present invention does not require a center tap transformer, but can operate with such transformers.

In a preferred embodiment of the present invention, the rectifier further comprises first and second switches, the first and second switches selected from the group consisting of: (1) diodes and (2) metal oxide semiconductor field effect transistors (MOSFETs). Thus, the present invention may operate with both passive and active rectifying devices.

In a preferred embodiment of the present invention, an inductance of the first output inductor is related to an inductance of the second output inductor by the equation:

$$L_{out1} = (L_{out2}*(1-D))/D$$

where: (1) $L_{out1}$ is the inductance of the first output inductor, (2) $L_{out2}$ is the inductance of the second output inductor and (3) D is the predetermined duty cycle operating point of the converter. Once a designer selects a D appropriate to a given application, the appropriate $L_{out1}$ and $L_{out2}$ to yield essentially zero ripple at that duty cycle operating point D are determinable.

In a preferred embodiment of the present invention, the predetermined duty cycle operating point of the converter is other than 50%. Thus, the present invention allows a converter to operate at essentially zero ripple output current along the full range of duty cycle operating points from more than 0% to a full 100%.

In a preferred embodiment of the present invention, the rectifier further comprises an output capacitor coupled to the first and second output inductors to reduce the ripple current when the converter is operating at other than the predetermined duty cycle operating point. In the embodiments to be described, a designer may select a duty cycle operating point centered in an anticipated duty cycle operating range. Within the duty cycle operating range, but not exactly at the duty cycle operating point, the output capacitor may be minimally sized to reduce any non-zero ripple current component.

Another aspect of the present invention provides an electrical system, comprising: (1) a power conversion stage including power switching devices for receiving electrical power and producing therefrom bipolar electrical input power substantially free of dead time, (2) a transformer having a primary winding coupled to the power conversion stage and having two taps on a secondary winding thereof, the primary winding receiving the bipolar electrical input power from the power conversion stage, (3) a hybridge rectifier coupled between the two taps and including first and second output inductors of independently selectable, differing inductance, the hybridge rectifier receiving the input power from the transformer via the two taps and rectifying the input power to produce an output power substantially free of ripple current at a predetermined duty cycle operating point of the converter, the first and second output inductors being of independently selectable, differing inductance thereby to allow the predetermined duty cycle operating point to be adjustable and (4) an electrical load, coupled to the rectifier, for receiving and dissipating the output power.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
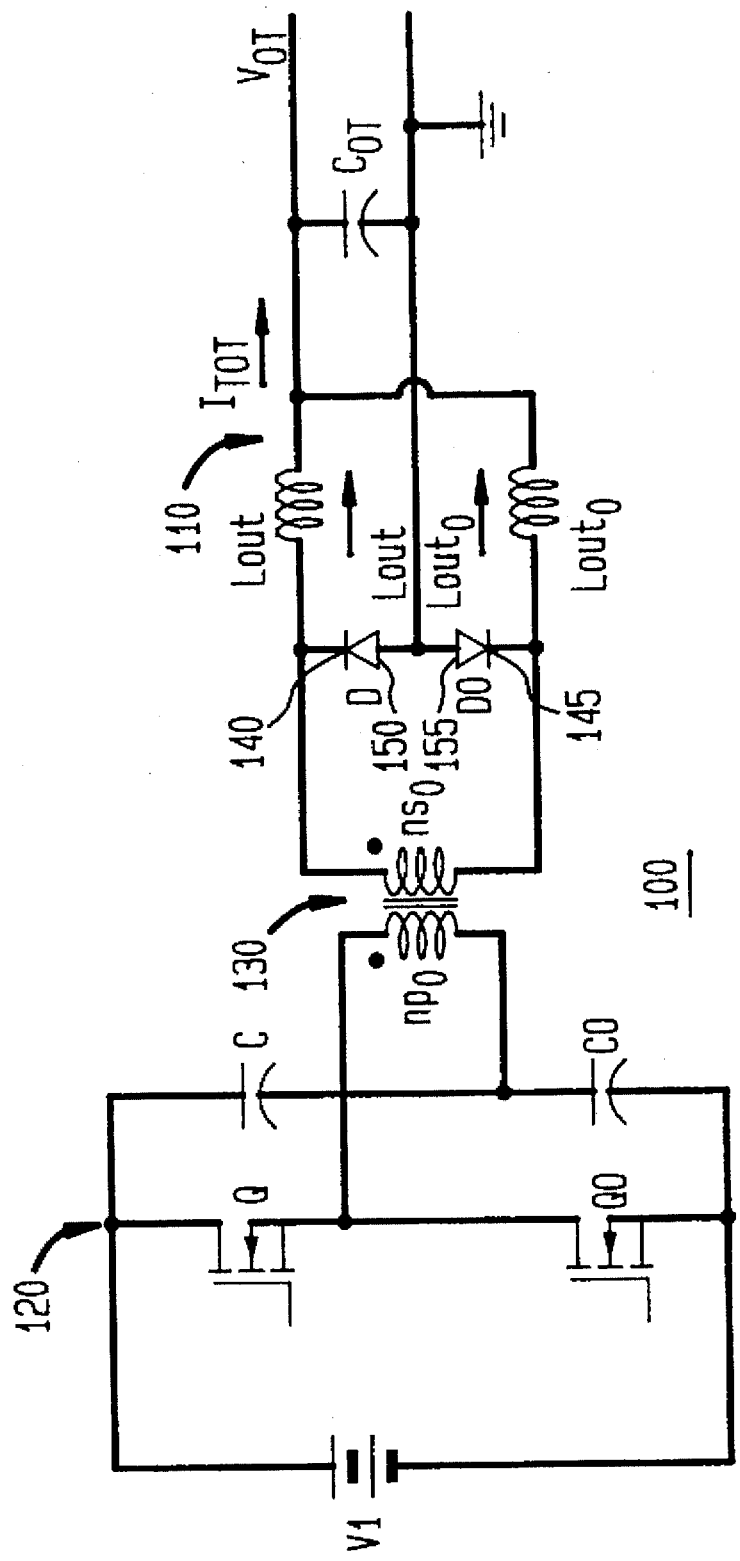
FIG. 1 illustrates a schematic diagram of a half-bridge power converter employing a hybridge rectifier circuit of the prior art.

Referring initially to FIG. 1, illustrated is a schematic diagram of a half-bridge power converter 100 employing a hybridge rectifier circuit 110 of the prior art. The half-bridge power converter 100 includes a bridge circuit 120 consisting of a pair of switching transistors Q, Q0 that drive a transformer 130. The bridge circuit 120 is further illustrated with an input voltage Vi and a pair of capacitors C, C0. The transformer 130, having a primary and secondary winding $np_0$, $ns_0$, isolates the bridge circuit 120 from the hybridge rectifier circuit 110.

The hybridge rectifier circuit 110 comprises a pair of rectifier diodes D, D0 connected to an output load (not shown). The first electrode 140, 145 of the rectifier diodes D, D0, respectively, is connected to the secondary winding $ns_0$ of the transformer 130 and to a pair of output inductors Lout, $Lout_0$, respectively, located between the rectifier diodes D, D0 and the output of the half-bridge power converter 100. The second electrode 150, 155 of the rectifier diodes D, D0, respectively, is connected through a capacitor $C_{OT}$ to the output of the half-bridge power converter 100. The secondary winding $ns_0$ of the transformer 130 draws a current Iout through one of the diodes D via one output inductor Lout while the other output inductor $Lout_0$ draws a current $Iout_0$ through the same diode D. This operation allows the secondary winding $ns_0$ of the transformer 130 to be partially bypassed such that both currents Iout, $Iout_0$ simultaneously contribute to the output current $I_{TOT}$.

An operational characteristic of the half-bridge power converter 100 is that the primary and secondary windings $np_0$, $ns_0$ of the transformer 130 are driven with bipolar voltages with some dead time in between. As a result, there is a current ripple component in the currents Iout, $Iout_0$ through the output inductors Lout, $Lout_0$, respectively, and a current ripple component exhibited in the output current $I_{TOT}$ of the hybridge rectifier circuit 110. The current ripple component in the output current $I_{TOT}$ is undesirable because it effects the overall efficiency of the half-bridge power converter 100. One of the interesting aspects of the hybridge rectifier circuit 110 is that the currents Iout, $Iout_0$ through the output inductors Lout, $Lout_0$, respectively, tend to cancel one another at a summing junction. The resulting cancellation provides a net lower current ripple component in the output current $I_{TOT}$ that occurs at twice the switching frequency.

As previously mentioned, at a 100% duty cycle of the switching transistors Q, Q0 of the bridge circuit 120 of the half-bridge power converter 100, a condition exists whereby the current ripple components of the currents Iout, $Iout_0$ through the output inductors Lout, $Lout_0$, respectively, are equal and opposite, leading to full cancellation and a zero-ripple current component in the output current $I_{TOT}$ of the half-bridge power converter 100. The zero-ripple current condition only occurs at a single input voltage for a given converter and output voltage of the converter. For the half-bridge power converter 100, the zero-ripple current point can only occur at the lowest input voltage Vi; thereafter, the current ripple component in the output current $I_{TOT}$ continually increases with an increase in the input voltage Vi. Thus, the output inductors Lout, $Lout_0$ and output capacitor $C_{OT}$ at the output of the half-bridge power converter 100 must be oversized for the worst-case operating condition, thereby diminishing the benefit derived from the half-bridge power converter 100 operating at the zero-ripple current condition. Moreover, operating the half-bridge power converter 100 at the 100% duty cycle in an attempt to cancel out the ripple current component in the output current $I_{TOT}$ is not a practical operating point for the half-bridge power converter 100. Thus, other converter topologies employing a hybridge rectifier circuit are more attractive.

It is desirable, therefore, to design a converter where the zero ripple condition is adjustable as a design parameter. The converter would then have a zero ripple current point at the midpoint of the input operating range thereby reducing the worst case current ripple component in the converter output at the input voltage extremes. Also, a converter employing such a design will incorporate smaller output inductors and capacitors to achieve the requisite output voltage. However, this type of design criteria is not possible with the half-bridge power converter 100.

Figure 2:
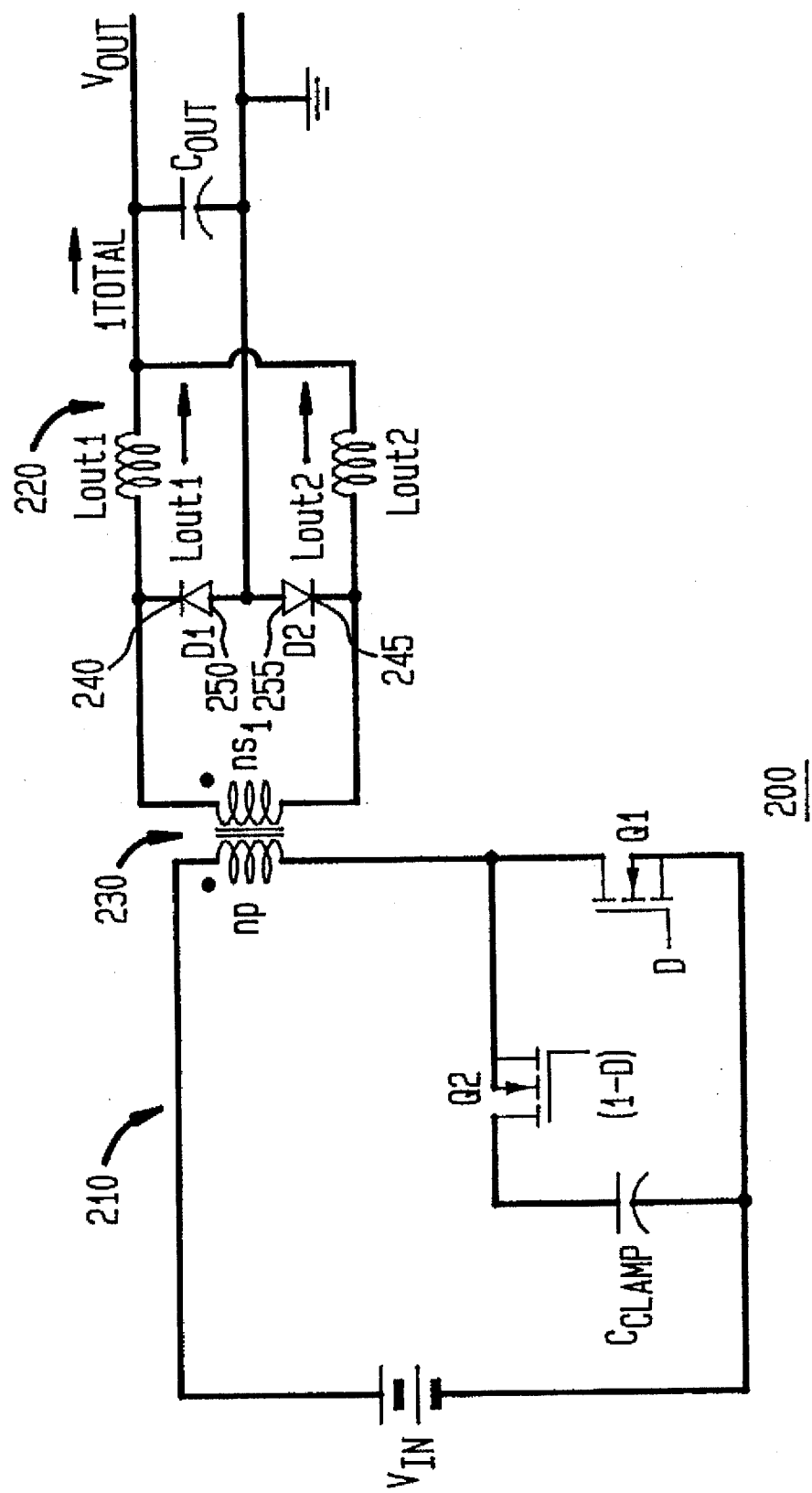
FIG. 2 illustrates a schematic diagram of a power converter with an active clamp circuit and a hybridge rectifier circuit employing the principles of the present invention.

Turning now to FIG. 2, illustrated is a schematic diagram of a power converter 200 with an active clamp circuit 210 and a hybridge rectifier circuit 220 employing the principles of the present invention. The active clamp circuit 210 consists of a pair of switching transistors Q1, Q2 that drive a transformer 230. The active clamp circuit 210 is further illustrated with an input voltage (representing an electrical input power) Vin and a clamp capacitor Cclamp. The input voltage Vin together with the active clamp circuit 210 constitute a power source to the transformer 230. The transformer 230, having a primary and secondary winding np, ns1, isolates the active clamp circuit 210 from the hybridge rectifier circuit 220. While the transformer 230 is illustrated free of a center tap, the principles of the present invention are equally applicable to a power converter employing a center-tapped transformer.

The hybridge rectifier circuit 220 comprises a pair of rectifier diodes D1, D2 ("first and second switches") connected to an output load (not shown). The first electrode 240, 245 of the rectifier diodes D1, D2, respectively, is connected to the secondary winding ns1 of the transformer 230 and to a pair of output inductors Lout1, Lout2, respectively, located between the rectifier diodes D1, D2 and the output of the power converter 200. The second electrode 250, 255 of the rectifier diodes D1, D2, respectively, is connected through a capacitor Cout to the output of the power converter 200. The secondary winding ns1 of the transformer 230 draws a current Iout1 through one of the diodes D1 via one output inductor Lout1 while the other output inductor Lout2 draws a current Iout2 through the same diode D1. This operation allows the secondary winding ns1 of the transformer 230 to be partially bypassed such that both currents Iout1, Iout2 simultaneously contribute to the output current $I_{TOTAL}$.

Analogous to the half-bridge power converter 100 of FIG. 1, the active clamp circuit 210 of the power converter 200 drives the transformer 230 with a bipolar voltage, but without the existence of the dead time inherent in the bridge circuit 120 of the half-bridge power converter 100. As a result of the lack of dead time, the frequency of the current ripple component in the output current $I_{TOTAL}$ is equal to the switching frequency of the active clamp circuit 210. Additionally, the power converter 200 exhibits a zero ripple operating point at a 50% duty cycle (conventionally referred to as D, (1–D) for the switching transistors Q1, Q2, respectively). Therefore, as opposed to the half-bridge power converter 100 (where the zero ripple condition occurs at a 100% duty cycle), it is possible to design the power converter 200 with the zero ripple point centered within an acceptable range of the input voltage Vin thereby minimizing the worst case ripple at the extremes therein.

However, it is often undesirable to design the power converter 200 with a 50% duty cycle at the midpoint of the input voltage Vin because of the resulting stress on the components of the power converter 200 that ensues at the extremes of the input voltage Vin. The following equations are submitted to describe the scope of the stress on the components of the power converter 200. The off-state drain voltage of the switching transistor Q1 is:

$$V_{Q1}=Vin/(1-D) \quad (1)$$

where;

$$Vout=Vin*(ns1/np)*D$$

and $$D=(Vout/Vin)*(np/ns1).$$

Therefore, the voltage stress on the switching transistor Q1 can be reduced by decreasing the primary to secondary winding turns ratio (np/ns1) thereby decreasing the duty cycle of the switching transistors Q1, Q2, respectively.

Employing the principles of the present invention to the power converter 200 provides an avenue to shift the zero ripple condition away from the 50% duty cycle point to improve performance while at the same time reducing the output inductance Lout1, Lout2 of the power converter 200. Current ripple cancellation occurs when the slope of the current ripple component of the current Iout1 through the output inductor Lout1 is equal and opposite to the slope of the current ripple component of the current Iout2 through the output inductor Lout2. The slope of the currents Iout1, Iout2 will be equal and opposite when:

$$V_{Lout1}/Lout1=V_{Lout2}/Lout2. \quad (4)$$

During the time that the switching transistor Q1 is conducting, then:

$$[(Vin/(np/ns1))-Vout]=Vout/Lout2. \quad (5)$$

By combining equations (2) and (5), the following relationship between the duty cycle and the output inductors Lout1, Lout2 can be derived to obtain the zero ripple condition:

$$Lout1=[(Lout2*(1-D))/D]. \quad (6)$$

By adjusting the ratio of the value of the output inductors Lout1, Lout2, ripple cancellation may be achieved at any desired duty cycle thereby permitting the design of the power converter 200 to be tailored such that the input voltage Vin corresponding to an current ripple cancellation in the output current $I_{TOTAL}$ occurs at the most desirable point of the range of the input voltage Vin.

The present invention therefore achieves a zero ripple condition in the output current $I_{TOTAL}$ at any predetermined duty cycle operating point by altering the relative inductances of the output inductors Lout1, Lout2. This is starkly contrasted with the prior art, wherein the output inductors were unerringly of the same value, severely restricting the freedom to choose a duty cycle operating point suitable to a given application.

Figure 3:
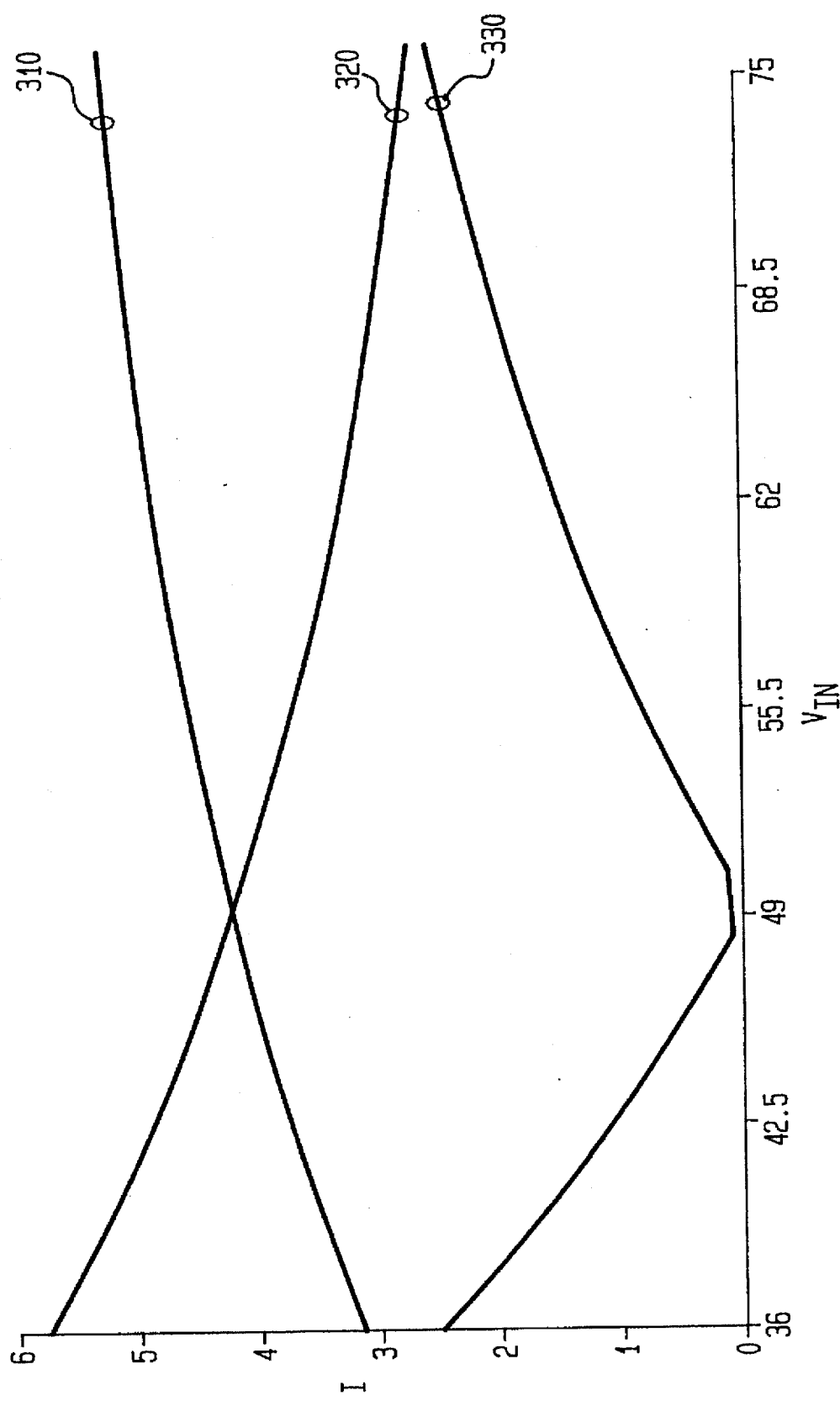
FIG. 3 illustrates a graphical representation of current ripple cancellation in the power converter of FIG. 2.

Turning now to FIG. 3, illustrated is a graphical representation of current ripple cancellation in the power converter 200 of FIG. 2. With continuing reference to FIG. 2, lines 310, 320 represent the currents Iout1, Iout2 in the output inductors Lout1, Lout2, respectively, and line 330 represents the sum of the currents Iout1, Iout2. The currents are plotted against the input voltage Vin to the power converter 200. The values of the output inductors Lout1, Lout2 are set to confer equal current ripple at the extremes of the input voltage Vin to the power converter 200. The values of the pertinent components of the power converter 200 to achieve ripple cancellation are as follows: Lout1=2.3 microhenrys, Lout2=1.6 microhenrys, turns ratio (np/ns1)=4 and the operating frequency=300 kilohertz. As illustrated in the graphical representation, under these set of circumstances ripple cancellation does not occur at the midpoint of the range of the input voltage Vin, but at an input voltage Vin equal to 49 volts.

Figure 4:
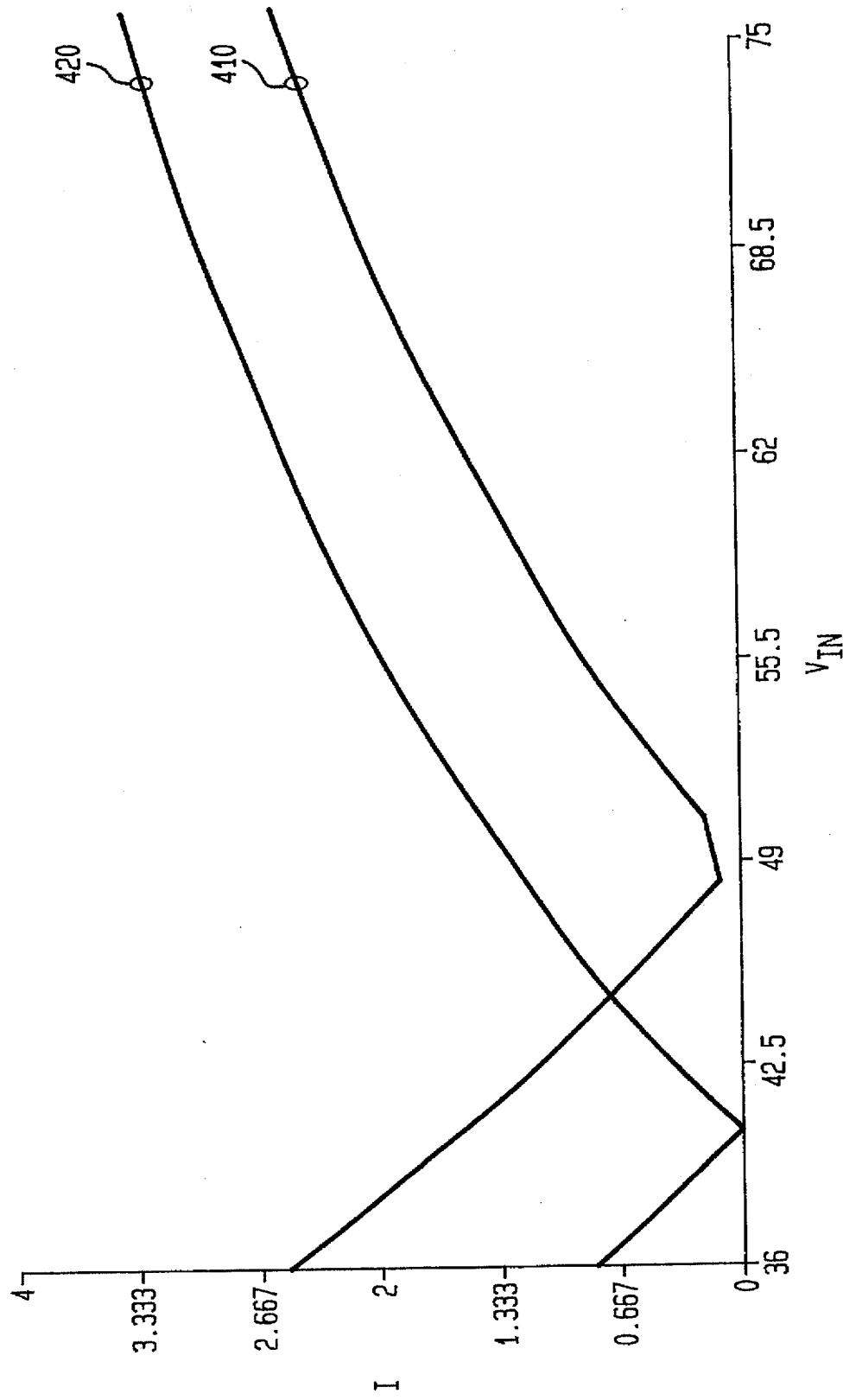
FIG. 4 illustrates a graphical representation of a comparison of current ripple cancellation in the power converter of FIG. 2.

Turning now to FIG. 4, illustrated is a graphical representation of a comparison of current ripple cancellation in the power converter of FIG. 2. With continuing reference to FIG. 2, line 410 represents the output current $I_{TOTAL}$ associated with unequally sized output inductors Lout1, Lout2 and line 420 represents the output current $I_{TOTAL}$ associated with equally sized output inductors Lout1, Lout2. The currents are plotted against the input voltage Vin to the power converter 200. The values of the output inductors Lout1, Lout2 associated with the line 410 are as follows: Lout1=2.3 microhenrys, Lout2=1.6 microhenrys; the values of the output inductors Lout1, Lout2 associated with the line 420 are as follows: Lout1=Lout2=2.3 microhenrys. Notice that even though the total inductance associated with the line 410 is less, the worst case current ripple is also less. As a result, the overall operating conditions of the power convertor 200 are enhanced by mismatching the values of the output inductors Lout1, Lout2 thereby providing a more efficient power converter 200 while at the same time decreasing the size of the output capacitor Cout.

Figure 5:
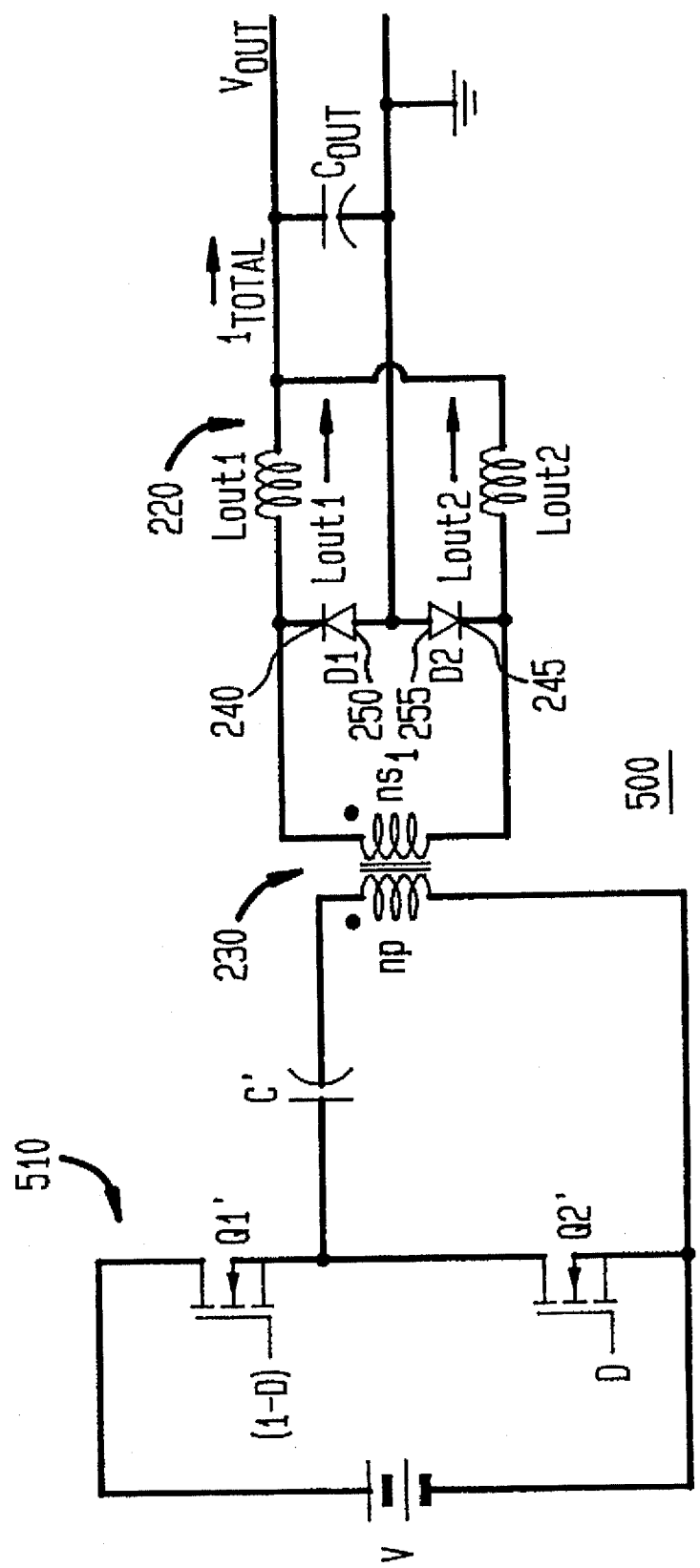
FIG. 5 illustrates a schematic diagram of a power converter with a ZVS half-bridge circuit and the hybridge rectifier circuit of FIG. 2 employing the principles of the present invention.

Turning now to FIG. 5, illustrated is a schematic diagram of a power converter 500 with a ZVS half-bridge circuit 510 and the hybridge rectifier circuit 220 of FIG. 2 employing the principles of the present invention. The ZVS half-bridge circuit 510 was originally presented in Loftus and generally consists of a pair of switching transistors Q1', Q2' that drive the transformer 230. The ZVS half-bridge circuit 510 is further illustrated with an input voltage V (representing an electrical input power) and a capacitor C'. The input voltage V together with the ZVS half-bridge circuit 510 constitute a power source to the transformer 230. The transformer 230, having the primary and secondary winding np, ns1, isolates the ZVS half-bridge circuit 510 from the hybridge rectifier circuit 220. While the transformer 230 is illustrated free of a center tap, the principles of the present invention are equally applicable to a power converter employing a center-tapped transformer.

Again, the hybridge rectifier circuit 220 comprises the pair of rectifier-diodes D1, D2 ("first and second switches") connected to an output load (not shown). The first electrode 240, 245 of the rectifier diodes D1, D2, respectively, is connected to the secondary winding ns1 of the transformer 230 and to the pair of output inductors Lout1, Lout2, respectively, located between the rectifier diodes D1, D2 and the output of the power converter 500. The second electrode 250, 255 of the rectifier diodes D1, D2, respectively, is connected through the capacitor Cout to the output of the power converter 500. The secondary winding ns1 of the transformer 230 draws the current Iout1 through one of the diodes D1 via one output inductor Lout1 while the other output inductor Lout2 draws the current Iout2 through the same diode D1. This operation allows the secondary winding ns1 of the transformer 230 to be partially bypassed such that both currents Iout1, Iout2 simultaneously contribute to the output current $I_{TOTAL}$.

Analogous to the power converter 200 of FIG. 2, the ZVS half-bridge circuit 510 of the power converter 500 drives the transformer 230 with a bipolar voltage without the existence of dead time. As a result of the lack of dead time, the frequency of the current ripple component in the output current $I_{TOTAL}$ is equal to the switching frequency of the ZVS half-bridge circuit 510. Additionally, the ZVS half-bridge circuit 510 of the power converter 500 is constrained to a duty cycle (conventionally referred to as D, (1–D) for the switching transistors Q2', Q1', respectively) ranging from 0–50% thereby making this topology particularly suitable for applying the principles of the present invention thereto.

Therefore, by adjusting the ratio of the value of the output inductors Lout1, Lout2 in accordance with the aforementioned relationships, ripple cancellation may be achieved at a desired duty cycle (between 0–50%) thereby permitting the design of the power converter 500 to be tailored such that the input voltage V corresponding to an current ripple cancellation in the output current $I_{TOTAL}$ occurs at the most desirable point of the range of the input voltage V.

Figure 6:
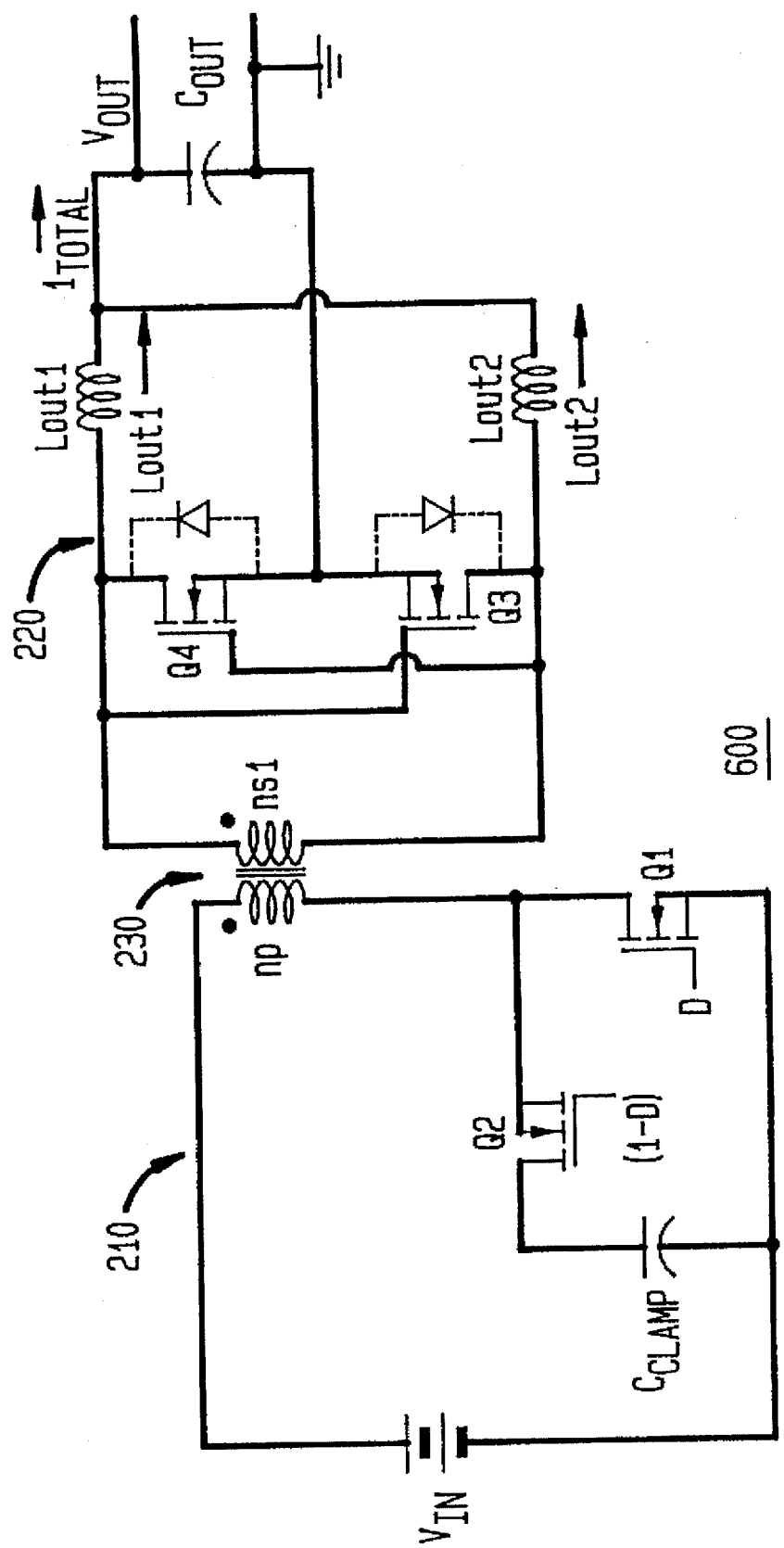
FIG. 6 illustrates a schematic diagram of a power converter with the active clamp circuit and an alternate embodiment of the hybridge rectifier circuit of FIG. 2 employing the principles of the present invention.

Turning now to FIG. 6, illustrated is a schematic diagram of a power converter 600 with the active clamp circuit 210 and an alternate embodiment of the hybridge rectifier circuit 220 of FIG. 2 employing the principles of the present invention. Again, the active clamp circuit 210 consists of the pair of switching transistors Q1, Q2 that drive the transformer 230. The active clamp circuit 210 is further illustrated with the input voltage Vin (representing the electrical input power) and the clamp capacitor Cclamp. The input voltage Vin together with the active clamp circuit 210 constitute the power source to the transformer 230. The transformer 230, having the primary and secondary winding np, ns1, isolates the active clamp circuit 210 from the hybridge rectifier circuit 220. While the transformer 230 is illustrated free of a center tap, the principles of the present invention are equally applicable to a power converter employing a center-tapped transformer.

In this alternative embodiment of hybridge rectifier circuit 220, a pair of MOSFET synchronous rectifiers Q3, Q4 ("first and second switches") replace the pair of rectifier diodes D2, D1, respectively, of FIG. 2. One of ordinary skill in the art will understand the differences and advantages of employing the MOSFET synchronous rectifiers Q3, Q4 in lieu of the rectifier diodes D2, D1 including that a MOSFET device is an active, rather than a passive, rectification device. Additionally, this alternative, embodiment of the hybridge rectifier circuit 220 of the power converter 600 is, otherwise, similarly constructed and operates analogously to the hybridge rectifier circuit 220 as described with respect to FIG. 2.

Again, the active clamp circuit 210 of the power converter 600 drives the transformer 230 with a bipolar voltage without the existence of the dead time. By applying the principles of the present invention through adjusting the ratio of the value of the output inductors Lout1, Lout2 in accordance with the aforementioned relationships, ripple cancellation may be achieved at a desired duty cycle thereby permitting the design of the power converter 600 to be tailored such that the input voltage Vin corresponding to an current ripple cancellation in the output current $I_{TOTAL}$ occurs at the most desirable point of the range of the input voltage Vin.

Therefore, once again, the present invention is not restricted to a given power source, including the power train front-end, or particular hybridge rectifier embodiment, as long as the power source is capable of generating bipolar power with essentially no dead time and the hybridge rectifier exhibits the characteristics as described above.

Figure 7:
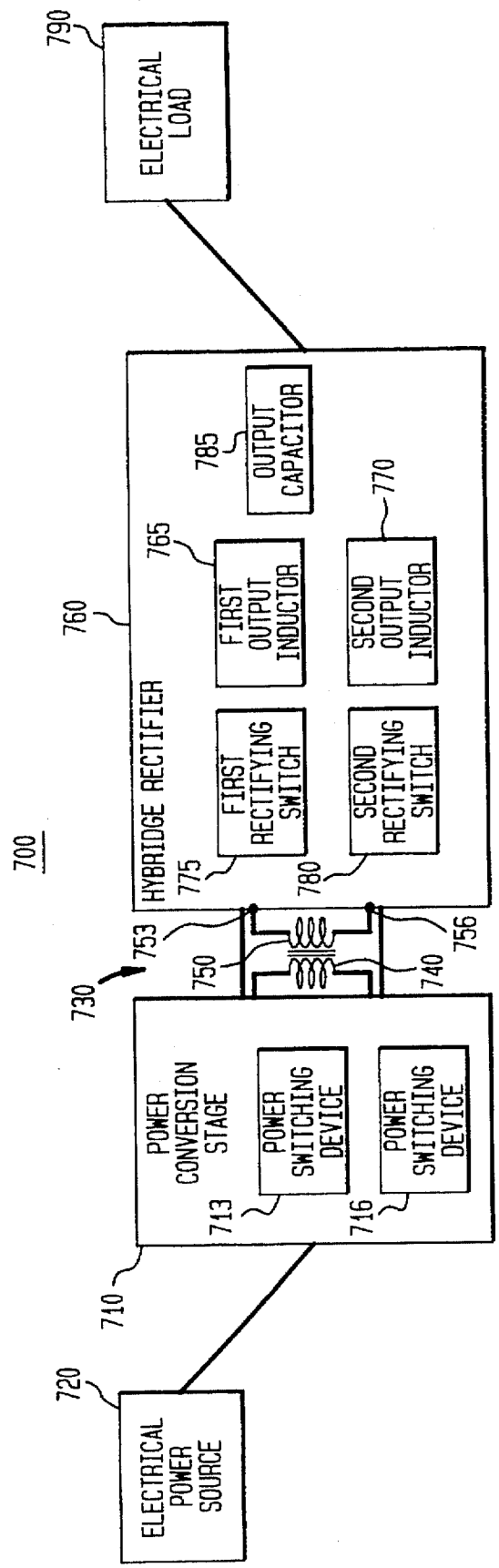
FIG. 7 illustrates a block diagram of an electrical system employing the principles of the present invention.

Turning now to FIG. 7, illustrated is a block diagram of an electrical system 700 employing the principles of the present invention. The electrical system 700 includes a power conversion stage 710 having power switching devices 713, 716 (e.g. field-effect-transistor "FET") for receiving electrical power from an electrical power source 720 and producing therefrom bipolar electrical input power substantially free of dead time. The power conversion stage encompasses, but is not limited to, an active clamp circuit or a ZVS half bridge circuit. The electrical system 700 also includes a transformer 730 having a primary winding 740 coupled to the power conversion stage 710 and a secondary winding 750 having two taps 753, 756 thereon. The primary winding 740 therein receives the bipolar electrical input power from the power conversion stage 710.

The electrical system 700 further includes a hybridge rectifier 760, coupled between the two taps 753, 756 of the secondary winding 750, that contains a first and second output inductor 765, 770 of independently selectable, differing inductance. The hybridge rectifier has a first and second rectifying switch 775, 780 consisting of diodes, metal oxide semiconductor field effect transistors (MOSFETs), or the like. The hybridge rectifier 760 receives the input power from the transformer 730 via the two taps 753, 756 of the secondary winding 750 and rectifies the input power to produce an output power substantially free of ripple current at a predetermined duty cycle operating point of the electrical system 700. The first and second output inductors 765, 770 are of independently selectable, differing inductance to thereby allow the predetermined duty cycle operating point to be adjustable. The hybridge rectifier 760 also contains an output capacitor 785 coupled between the first and second output inductors 765, 770 and an electrical load 790 to reduce the ripple current when the electrical system 700 is operating at other than the predetermined duty cycle operating point. Finally, the electrical system 700 incorporates the electrical load 790, coupled to the hybridge rectifier 760, for receiving and dissipating the output power. The electrical load 790 may include, but is not limited to, a laptop computer or a module for a telecommunication system employing an Integrated Services Digital Network ("ISDN").

Although the present invention has been described in detail, those skilled in the art should understand that they can make various changes, substitutions and alterations herein without departing from the spirit and scope of the invention in its broadest form.

What is claimed is:

1. A power converter, comprising:
   a transformer for receiving bipolar electrical input power from a power source, said power substantially free of dead time; and
   a hybridge rectifier coupled to said transformer and including first and second output inductors of independently selectable, differing inductance, said hybridge rectifier receiving said input power from said transformer and rectifying said input power to produce an output power substantially free of ripple current at a predetermined duty cycle operating point of said converter, said first and second output inductors being of independently selectable, differing inductance thereby to allow said predetermined duty cycle operating point to be adjustable.

2. The converter as recited in claim 1 wherein said power source is selected from the group consisting of:
   an active clamp circuit, and
   a ZVS half bridge circuit.

3. The converter as recited in claim 1 wherein a secondary winding of said transformer is free of a center tap.

4. The converter as recited in claim 1 wherein said rectifier further comprises first and second switches, said first and second switches selected from the group consisting of:
   diodes, and
   metal oxide semiconductor field effect transistors (MOSFETs).

5. The converter as recited in claim 1 wherein an inductance of said first output inductor is related to an inductance of said second output inductor by the equation:

$$L_{out1} = (L_{out2} * (1-D))/D$$

where:

$L_{out1}$ is said inductance of said first output inductor, $L_{out2}$ is said inductance of said second output inductor, and D is said predetermined duty cycle operating point of said converter.

6. The converter as recited in claim 1 wherein said predetermined duty cycle operating point of said converter is other than 50%.

7. The converter as recited in claim 1 wherein said rectifier further comprises an output capacitor coupled to said first and second output inductors to reduce said ripple current when said converter is operating at other than said predetermined duty cycle operating point.

8. A method of operating a power converter, comprising the steps of:
   receiving bipolar electrical input power from a power source into a transformer, said power substantially free of dead time; and
   receiving said input power from said transformer into a hybridge rectifier coupled to said transformer and including first and second output inductors of independently selectable, differing inductance, said hybridge rectifier rectifying said input power to produce an output power substantially free of ripple current at a predetermined duty cycle operating point of said converter, said first and second output inductors being of independently selectable, differing inductance thereby to allow said predetermined duty cycle operating point to be adjustable.

9. The method as recited in claim 8 further comprising the step of generating said input power in said power source, said power source selected from the group consisting of:
   an active clamp circuit, and
   a ZVS half bridge circuit.

10. The method as recited in claim 8 wherein a secondary winding of said transformer is free of a center tap.

11. The method as recited in claim 8 wherein said rectifier further comprises first and second switches, said step of receiving further comprising the step of rectifying said input power in said first and second switches, said first and second switches selected from the group consisting of:
    diodes, and
    metal oxide semiconductor field effect transistors (MOSFETs).

12. The method as recited in claim 8 further comprising the step of selecting an inductance of said first output inductor and an inductance of said second output inductor, said inductance of said first output inductor related to said inductance of said second output inductor by the equation:

$$L_{out1} = (L_{out2} * (1-D))/D$$

where $L_{out1}$ is said inductance of said first output inductor, $L_{out2}$ is said inductance of said second output inductor, and D is said predetermined duty cycle operating point of said converter.

13. The method as recited in claim 8 wherein said predetermined duty cycle operating point of said converter is other than 50%.

14. The method as recited in claim 8 wherein said rectifier further comprises an output capacitor coupled to said first and second output inductors, said method further comprising the step of reducing said ripple current with said output capacitor when said converter is operating at other than said predetermined duty cycle operating point.

15. An electrical system, comprising:

a power conversion stage including power switching devices for receiving electrical power and producing therefrom bipolar electrical input power substantially free of dead time;

a transformer having a primary winding coupled to said power conversion stage and having two taps on a secondary winding thereof, said primary winding receiving said bipolar electrical input power from said power conversion stage;

a hybridge rectifier coupled between said two taps and including first and second output inductors of independently selectable, differing inductance, said hybridge rectifier receiving said input power from said transformer via said two taps and rectifying said input power to produce an output power substantially free of ripple current at a predetermined duty cycle operating point of said converter, said first and second output inductors being of independently selectable, differing inductance thereby to allow said predetermined duty cycle operating point to be adjustable; and an electrical load, coupled to said rectifier, for receiving and dissipating said output power.

16. The system as recited in claim 15 wherein said power conversion stage is selected from the group consisting of:

an active clamp circuit, and a ZVS half bridge circuit.

17. The system as recited in claim 15 wherein said rectifier further comprises first and second switches, said first and second switches selected from the group consisting of:

diodes, and metal oxide semiconductor field effect transistors (MOSFETs).

18. The system as recited in claim 15 wherein an inductance of said first output inductor is related to an inductance of said second output inductor by the equation:

$$L_{out1}=(L_{out2}*(1-D))D$$

where:

$L_{out1}$ is said inductance of said first output inductor, $L_{out2}$ is said inductance of said second output inductor, and D is said predetermined duty cycle operating point of said converter.

19. The system as recited in claim 15 wherein said predetermined duty cycle operating point of said converter is other than 50%.

20. The system as recited in claim 15 wherein said rectifier further comprises an output capacitor coupled between said first and second output inductors and said electrical load to reduce said ripple current when said converter is operating at other than said predetermined duty cycle operating point.

* * * * *